Aug. 23, 1949.
T. M. FERRILL, JR
2,479,563
TABLE REFERENCE APPARATUS
Filed Aug. 2, 1946
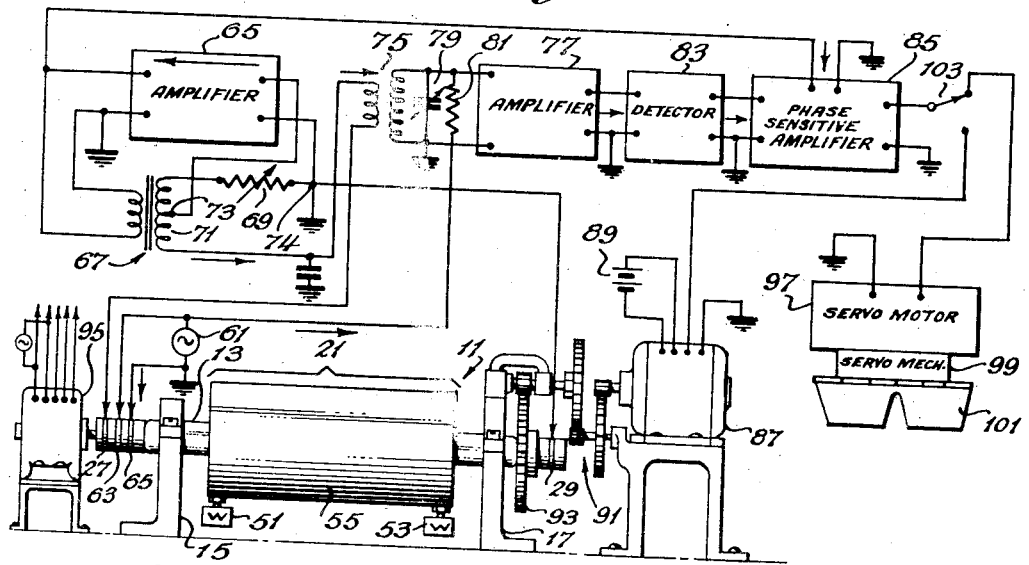
Fig. 1.
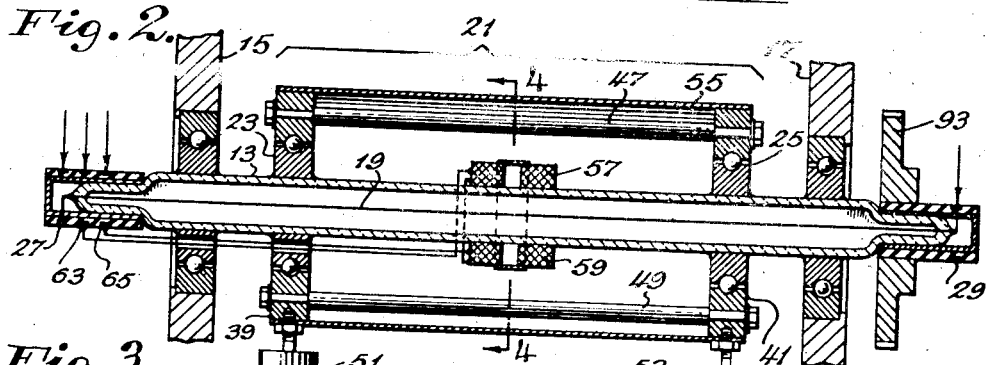
Fig. 2.
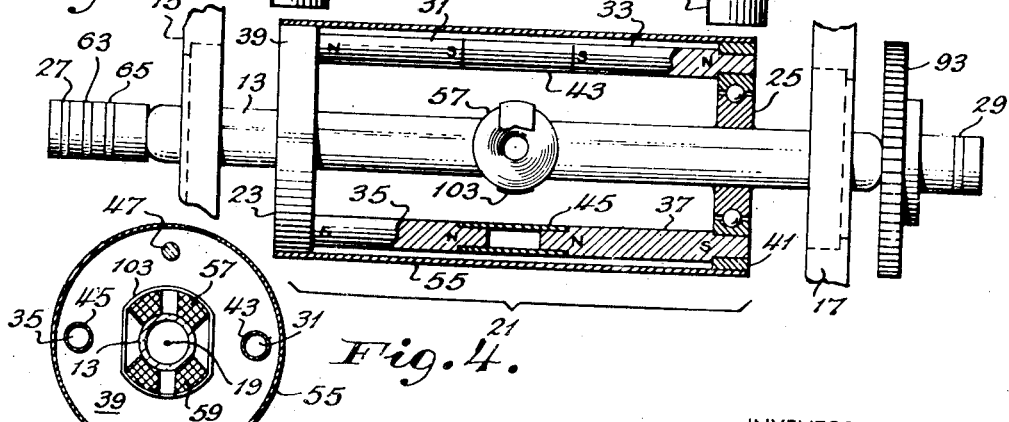
Fig. 3.
Fig. 4.
INVENTOR
THOMAS M. FERRILL, JR.
BY
Herbert A. Thompson
his ATTORNEY.

Patented Aug. 23, 1949

2,479,563

UNITED STATES PATENT OFFICE 2,479,563

STABLE REFERENCE APPARATUS

Thomas M. Ferrill, Jr., Hempstead, N. Y., assignor to The Sperry Corporation, a corporation of Delaware Application August 2, 1946, Serial No. 688,158

13 Claims. (Cl. 318—489)

The present invention relates to stable reference apparatus, and is particularly concerned with apparatus for determining variations of craft orientation or craft attitude, or for maintaining a predetermined craft attitude.

Vibratory apparatus has heretofore been provided for establishing a stable reference plane in space about a predetermined axis. This apparatus included a cantilever-supported rod-like element arranged to be vibrated in a transverse plane. Changes of craft attitude were determined by reference to the plane of vibration of the element. Such a structure is illustrated in Figs. 9, 10 and 11 of U. S. Reissue Patent 22,409 to Joseph Lyman, et al. In the apparatus there shown, the rod-like element was constructed of material characterized by high permeability, and was subjected to the transverse alternating magnetic fields of a pair of opposed electromagnets pendulously suspended and supplied by an alternating current generator.

The structure of the type shown in the above reference patent provides long time stability of the plane of vibration of the vibratory element when the element and the supporting structure associated therewith are very carefully arranged for precise equality of the vibratory characteristics in all of the planes passing through the rod-like element. In practice, this condition is achieved only by the exercise of extreme care in construction and adjustment. Furthermore, the employment of a pendulously suspended electromagnet supplied by an alternating voltage generator brings in problems of slip-ring connections at the journal bearings of the pendulously supported element, interfering somewhat with the freedom of the pendulous system.

It is an object of the present invention to provide high-performance stable reference apparatus characterized by great compactness and by enhanced simplicity of construction.

A further object is to provide a craft orientation responsive system for indicating or controlling craft attitude about a predetermined axis with maximum simplicity and very high stability.

In accordance with an important feature of the present invention, a very slender strand of elastic material is tightly stretched between two relatively widely spaced and horizontally displaced points in an evacuated supporting structure, and the strand is actuated by reaction of alternating current therethrough with a transverse magnetic field provided by a pendulous magnet system pivotally suspended about the strand. Pick-off means are provided for producing a signal varying according to apparent rotations of the plane of vibration of the strand, and this signal may be employed for actuating craft control servo apparatus such as an automatic pilot for maintaining a predetermined attitude of the craft. These pick-off signals, which may represent relative deviation between the plane of vibration of the strand and a plane in the supporting structure normally aligned with the plane of vibration, may be employed to actuate a follow-up motor for restoring the supporting structure to the position of alignment of the planes. In this way, the supporting structure is stabilized in space according to the vibratory stability endowment of the strand, and accordingly, a craft attitude indicator may be actuated by the supporting structure.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above objects and features of the present invention are brought out more fully, and other objects will become apparent in the following detailed description of an embodiment of the present invention considered in relation to the drawing, wherein, Fig. 1 is a schematic representation of a preferred embodiment of the present invention;

Fig. 2 is a vertical sectional view of a portion of Fig. 1;

Fig. 3 is a plan view, partly in section, of the structure shown in Fig. 2; and

Fig. 4 is a cross-sectional view taken on the line 4—4 in Fig. 2.

Like reference characters are employed throughout the figures to designate corresponding parts thereof.

In Fig. 1, there is shown a vibratory instrument assembly 11 including a capsule-like envelope 13 borne in journals in a pair of end stanchions 15 and 17. Within the envelope 13 is stretched a strand 19 of elastic material. This strand may be made of tungsten or platinum or a metal alloy, or it may comprise a metallized quartz filament. Suitable dimensions for this strand are a length of 3 to 5 inches and a diameter of 0.0005 inch. The tubular envelope 13 is made of relatively impermeable material, which preferably may be of vitreous substance such as glass or quartz.

A pendulous magnetic field system 21 is pivotally supported as by bearings 23, 25 for freedom about the axis defined by the strand 19. The magnetic field system 21 may be arranged in any desired manner to provide a predeterminedly aligned magnetic field transverse the strand 19, and this field may be directed horizontally, if desired, as by an arrangement of permanent magnet elements 31, 33, 35 and 37 included in the pendulous assembly 21. Magnets 31 and 35 may take the form of Alnico bar magnets having their outer ends fixedly supported in a permeable annular member 39 within which may be formed the outer race of the bearing 23. Magnets 33 and 37, which may be Alnico, similarly have their outer ends fixed in a permeable annular member 41 serving as the outer race of bearing 25. Magnets 31 and 33 are structurally joined at their middle by a tubular ferrule 43, and magnets 35 and 37 are similarly joined by a ferrule 45. Tie rods 47 and 49 may be employed between members 39 and 41 for structural rigidity of assembly 21. These tie rods may be of brass or aluminum, for example. Magnets 31 and 33 are arranged with their south poles joined in ferrule 43, while magnets 35 and 37 are arranged with their north poles joined in ferrule 45. With this arrangement, a unidirectional magnetic field is made to extend transversely of strand 19, for inducing vibration thereof in the plane normally passing through tie rods 47 and 49. Pendulous weights 51 and 53 are attached to the outer race members 39 and 41 of the bearings, to determine the normal spatial alignment of the magnetic field between magnets 35, 37 and magnets 31, 33. With the masses 51, 53 positioned relative to the magnets 31, 33, 35, 37 as shown in the drawing, the magnetic field transverse strand 19 is normally directed horizontally. A cylindrical shell 55 may be provided for forming a protective enclosure extending between bearings 23 and 25.

Slip rings 27 and 29 are attached to the ends of the envelope 13 and are connected to the opposite ends of the strand 19, for cooperation with suitable brushes to provide external circuit connections to the strand 19 for applying an alternating voltage thereto. When an alternating voltage is applied to the strand 19, the current therethrough reacts with the transverse magnetic field provided by the field system 21 to cause alternating forces to act on the strand and produce vibration thereof in the plane perpendicular to the magnetic field direction. With the relative positions of the masses 51, 53 and the magnets 31, 33, 35, 37 as shown in the drawing, these forces act to provide vertical-plane vibration of the strand 19.

A pair of coils 57 and 59 are arranged on the tubular envelope 13 and are energized by an alternating voltage supplied by a high frequency generator 61 connected through slip rings 63 and 65 to the coils. These coils are arranged to provide an alternating magnetic field directed substantially perpendicularly to the field of magnets 31, 33, 35 and 37, and hence, substantially parallel to the plane of vibration of the strand 19. Normally, therefore, the vibration of the strand 19 is in a direction parallel with the alternating field produced by coils 57 and 59, and hence, no voltage at the frequency of generator 61 is generated ordinarily in the strand 19 by its vibratory movement. However, if there is a component of movement of strand 19 transverse the fields of the coils 57 and 59, a voltage component is generated in strand 19 characterized by the frequency of the energy supplied by generator 61 modulated according to the periodic variation of speed of movement of the strand 19.

Circuit arrangements for maintaining strand 19 in vibration transverse the normal direction of the magnetic field produced by the magnets 31, 33, 35 and 37, and for utilizing the voltage induced in the strand 19 upon divergence between the axis of coils 57 and 59 and the plane of vibration of strand 19, are set forth in Fig. 1.

An amplifier 65 is arranged with its output circuit coupled through an impedance matching transformer 67 to a series load resistance 69 and the impedance of strand 19 between slip rings 27 and 29. The secondary winding 71 of the transformer 67 is provided with an intermediate tap 73 such as a center tap, and the resistor 69 is adjusted to provide a resistance value of the order of magnitude of the resistance of the strand 19. Thus, the center-tapped secondary winding 71 and the series resistances of elements 69 and 19 form a bridge circuit which, in the absence of motion of the strand 19, would be characterized by zero potential difference between tap 73 and the junction 74 between resistor 69 and the strand 19. Junction 74 may be grounded. This junction is connected to one input terminal of the amplifier 65, the other input terminal of amplifier 65 is connected to the secondary winding tap 73. As set forth in U. S. patent application Serial No. 556,525 filed September 3, 1944, by Montgomery H. Johnson, this bridge circuit becomes unbalanced upon vibratory motion of the strand 19 in the transverse magnetic field, by virtue of the back-E. M. F. or voltage induced in the strand 19 by generator action in the field of magnets 31, 33, 35, 37 with the result that there is supplied to the input terminals of amplifier 65 a net input voltage representing the movement of strand 19 in the magnetic field. With suitable adjustment of the bridge resistor 69, the amplifier 65 may be made to provide vibration reinforcing current through the strand 19 according to this amplifier input signal, so that vibrations of the strand are sustained at a frequency determined by the length, mass and tension of the strand. The strand is thus the primary determinant of the frequency and phase of its driving current. The amplifier 65 will provide a gradual increase of the vibration amplitude of the strand 19 until the energy supplied by the amplifier is just sufficient to offset losses of energy due to the movement of the strand. If desired, the amplifier 65 may be arranged for limiting its output signal at a relatively low output level, as by the provision of limiter or automatic gain control circuits therein.

The modulated high frequency voltage induced in the strand 19 according to a transverse component of motion thereof relative to the coils 57 and 59 is supplied through a high frequency transformer 75 having a low impedance input coil connected in series with strand 27 and the output circuit of transformer 67, to an amplifier 77 which may comprise any desired number of tuned amplifier stages. The secondary winding circuit of the transformer 75 may be tuned by a variable capacitor 79 connected in shunt therewith, for affording maximum response to signals of the frequency of generator 61, and for discrimination against signals of other frequencies. A resistor 81 is connected between the high potential terminal of generator 61 and the high potential input terminal of amplifier 77, for supplying to amplifier 77 an energy component from generator 61 independently of the movement of the strand 19 in the fields of coils 57 and 59. With this connection, the signal applied to amplifier 77 is characterized by unambiguous modulation at a frequency corresponding identically with the frequency of vibration of the strand 19.

A detector 83 is arranged to receive the amplified output signal provided by amplifier 77, and to deliver to a phase sensitive amplifier 85 an input signal of the frequency of vibration of the strand 19 and of amplitude and phase dependent upon the direction and extent of divergence between the direction of movement of a point at the middle of strand 19 and the axis of coils 57 and 59. The phase sensitive amplifier 85 is supplied with a phase reference input signal from the output circuit of the vibration-sustaining amplifier 65. The output circuit of the phase sensitive amplifier 85 provides a direct voltage of polarity and magnitude dependent upon the direction and extent of the above described divergence.

The output voltage from the phase sensitive amplifier 85 may, if desired, be supplied to the control terminals of a reversible motor 87, e. g., to the field winding terminals thereof. The armature of the motor 87 is supplied with direct-current power by a battery 89. Motor 87 may be coupled as through a gear train 91 to a gear element 93 fixed to the envelope 13 and arranged to control the orientation thereof in such a way as to suppress the modulation of signals supplied to amplifier 77, and to retain the axis of coils 57 and 59 aligned parallel to the direction of movement of a point at the middle of strand 19. With this arrangement, the envelope 13 is retained in substantially fixed relation to the plane of vibration of the strand 19, and hence, the stability of the plane of vibration of the strand 19 is reproduced in the stabilized orientation of the envelope 13. Accordingly, envelope 13 may be connected to the rotor of a self-synchronous data transmitter 95 arranged to supply craft attitude data signals either to a self-synchronous data repeater or to an automatic pilot system arranged to control the craft orientation in accordance with the variation of output signals from unit 95.

Alternatively, the output signal from the phase sensitive amplifier 85 may be supplied directly to an automatic pilot servomotor apparatus 97 including coupling means 99 for actuating an appropriate craft control surface 101, such as an aircraft elevator control surface where the unit 11 is installed in the aircraft with the strand 19 extending substantially athwartship. If desired, a switch 103 may be provided for selecting between direct automatic pilot operation, with the switch arm in the upper position as shown in Fig. 1, or indirect control, with the switch arm thrown to its downward position.

It is desirable that the coils 57 and 59 be clamped to the envelope 13 as by a flexible, impermeable band 103, in the orientation with the axis of these coils parallel with the preferred plane of vibration of the strand 19. For this purpose, trial operations of the strand should be made to observe any tendencies thereof to drift toward a preferred plane or a plane of minimum restraint, and the coils 57 and 59 should be released and rotated about the tubular envelope 13 until such tendencies are minimized. In this way, maximum long-time stability of performance of the strand is insured.

It will be readily apparent that many modifications may be made in the present invention without material departure from the principles thereof. For example, permanent magnets 31, 33, 35 and 37 may be replaced by electromagnets, if desired, so that electrical control of the pendulous reference for the vibration direction may be instituted in a particular instance. However, the permanent magnet field system affords extreme simplicity in the present invention, and provides for freedom from mechanical drag or coercion of the rotary magnetic field system 21 due to any slip ring connections which would be required with an electromagnetic field system.

As is readily apparent, the vibratory apparatus described above serves the purposes for which gyroscopes having universally suspended massive rotors driven at high speed have heretofore been employed; i. e., for providing a stable reference system controllable according to the direction of a force field such as the earth's gravitational field, but responding so gradually to changes of the apparent direction of the force field as to be relatively immune to such apparent changes as are due to turns of a craft or similar disturbing influences.

With this apparatus, rotor bearing problems are eliminated, as is also the requirement for supplying relatively high power for sustaining the motion of the sensitive element. A simple pendulous pivoted magnet system provides straightforward gravity reference, serving at the same time an important function in the supplying of motive power for the sensitive element, and contrasting markedly with the indirectly operating precessional erectors required with instruments employing massive, high-speed rotors. The sensitive element unit of the present invention is inherently of a permanent character, having no high-speed bearings. Moreover, if such an element is accidentally broken, it is readily replaced. No such precision construction requirements are present in this unit as are involved in the precise balancing of a gyroscope rotor and adjustment of bearings therefor.

The strand employed in the present invention is so tightly stretched as to provide a very great ratio of the lateral forces acting to urge the strand toward the axis between the suspension points to the lateral forces due to bending at the ends of the strand. This, together with the extremely large ratio of length to diameter of the strand, insures long-time stability of vibration of the strand. With the orientation of the supporting member or envelope in the way to permit normal operation of the strand in its preferred plane, moreover, and with the operation of the follow-up system to retain the supporting member substantially in preferred-plane alignment with respect to the plane of vibration of the strand, the vibratory strand system provides a very accurate and dependable reference system of extraordinary simplicity and compactness.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. Vibratory stable reference apparatus com- prising a strand supporting member, a strand stretched along a substantially horizontal line between two points in said supporting member, periodically varying electrical means for instituting and maintaining transverse vibration of said strand in a predetermined plane, and means for detecting the plane of vibration of said strand to provide information as to orientation about said horizontal line.

2. Vibratory stable reference apparatus comprising a strand supporting member arranged to be mounted upon a controllable craft, a strand stretched along a substantially horizontal line between two points in said supporting member, means for instituting transverse vibration of said strand in a predetermined plane, and means responsive to variations in the angular relation about an axis between said two points between the plane of vibration of said strand and a predetermined plane in said craft for varying the attitude to suppress said variations.

3. Vibratory stable reference apparatus comprising a strand supporting member, a strand stretched along a substantially horizontal line between two points in said supporting member, and means including a pendulous magnetic field-directing unit suspended for freedom about said line for sustaining transverse vibration of said strand in a plane having a predetermined alignment relative to the direction of gravity.

4. Vibratory reference apparatus comprising a strand supporting member, a strand stretched between two points in said supporting member, magnetic field generating means pivotally supported relative to said supporting member for rotation about said strand and arranged for directing a magnetic field transversely of said strand, means for supplying alternating voltage to said strand for producing alternating reaction forces with said field, and means for denoting the plane of vibration of said strand for determining the integrated direction of said magnetic field.

5. Vibratory reference apparatus comprising a strand supporting member adapted to be mounted on a movable craft, a strand stretched between two points in said supporting member, magnetic field generating apparatus pivotally supported relative to said supporting member for rotation about said strand and arranged for directing said magnetic field transversely of said strand, said magnetic field generating apparatus having its center of gravity displaced from its axis of pivotal support, and means for supplying alternating voltage to said strand for producing alternating force reactions with said field.

6. Vibratory reference apparatus comprising a strand supporting member adapted to be mounted in a controllable craft, a strand stretched between two points in said supporting member, magnetic field generating apparatus pivotally supported relative to said supporting member for rotation about said strand and arranged for directing a magnetic field transversely of said strand, said magnetic field generating apparatus having its center of gravity displaced from its axis of rotation in order to provide a predetermined spatial relation between said magnetic field and forces acting upon the center of gravity of said magnetic field generating apparatus, means for supplying alternating voltage to said strand for producing alternating force reactions with said field and inducing vibration of said strand transversely of said field, and means responsive to the vibration of said strand and arranged to be operatively coupled to said craft for controlling the attitude of said craft in predetermined relation to the plane of vibration of said strand.

7. Vibratory reference apparatus comprising a strand supporting member, a strand stretched between two points in said supporting member between which there is a horizontal component of displacement, pendulous means pivotally suspended about said supporting structure for directing a magnetic field transversely of said strand in a direction normally determined by the pendulosity of said means, and means for applying to said strand and alternating voltage of frequency controlled according to the natural period of vibration of said strand to produce vibration-sustaining force reactions between said strand and said magnetic field.

8. Vibratory craft attitude reference apparatus comprising a strand supporting member adapted to be mounted on a craft, a strand stretched in said supporting member along an axis between two points between which there normally is a horizontal component of displacement, means for producing vibratory movement of said strand in a plane passing through said two points, means for instituting vibration of said strand, and motive means responsive to the vibration of said strand for controlling the orientation of said supporting member to suppress relative rotation about the axis between said two points between said supporting member and the plane of vibration of said strand.

9. Vibratory craft attitude reference apparatus as defined in claim 8, wherein said motive means responsive to the vibration of said strand for controlling the orientation of said supporting member comprises means responsive to relative angular displacement between the plane of vibration of said strand and a plane in said supporting member normally aligned therewith for producing an error signal, and a craft attitude control servomotor responsive to said error signal for varying the attitude of said craft to restore said supporting member to said predetermined alignment.

10. Vibratory craft attitude reference apparatus as defined in claim 8, wherein said motive means responsive to the vibration of said strand for controlling the orientation of said supporting member comprises means responsive to vibration of said strand for producing a signal varying according to relative angular departure between the plane of vibration of said strand and a plane in said supporting member normally aligned therewith, means responsive to said signal for providing relative rotation between said supporting member and said craft about the axis passing through said two points for restoring alignment between said two planes, and means responsive to the relative rotation between said craft and said supporting member for varying the attitude of said craft in accordance therewith.

11. Vibratory stable reference apparatus comprising a supporting member, a vibratory element connected thereto and arranged for planar vibration in said supporting member, pendulous means for controlling the plane of vibration of said member according to forces acting on said pendulous member, and supporting member driving means responsive to relative rotation between the plane of vibration of said element and a plane in said supporting member normally aligned therewith for controlling the orientation of said supporting member to suppress said variations.

12. Vibratory stable reference apparatus comprising a strand supporting structure adapted to be installed in a controllable craft, a strand of elastic material stretched between two points in said supporting structure, means responsive to vibratory movement of said strand for applying to said strand a first alternating voltage of frequency and phase dependent upon the vibration of said strand for sustaining vibration of said strand transverse an ambient magnetic field, means including a directional pick-off carried on said craft in proximity to said strand for producing a second voltage varying according to a component of vibration of said strand, and means coupled to said first means and said second means for varying the attitude of said craft according to the amplitude of said second voltage and the phase angle between said first voltage and said second voltage.

13. Vibratory stable reference apparatus comprising an evacuated tubular envelope, a strand of elastic material stretched along an axis between two points in said envelope, means for supporting said envelope upon a movable object with said axis substantially horizontal, means for directing a magnetic field transversely of said strand, means responsive to vibration of said strand in a plane transverse said magnetic field for applying to said strand a first alternating voltage of frequency and phase predeterminedly related to the movement of said strand for sustaining vibration of said strand, whereby said strand vibrates in a predetermined plane in space passing through said axis and tends to continue vibrating in said predetermined plane, means supported by said movable object in proximity with said strand and arranged to cooperate with said strand for producing a second alternating voltage varying in phase and amplitude according to the direction and magnitude of a relative angular departure between the plane of vibration of said strand and a plane in said object normally parallel with said strand, and means coupled to said last-named means and to said vibration responsive means and jointly responsive to said first and second alternating voltages for varying the space orientation of said movable object according to the magnitude of said second voltage and the phase angle between said first and second voltages.

THOMAS M. FERRILL, Jr.

REFERENCES CITED

The following references are of record in the file of this patent:

UNITED STATES PATENTS

| Number | Name | Date |
| --- | --- | --- |
| Re. 22,409 | Lyman et al. | Dec. 21, 1943 |